United States Patent Office 3,432,225
Patented Mar. 11, 1969

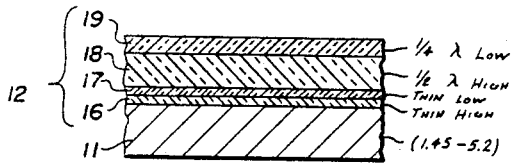
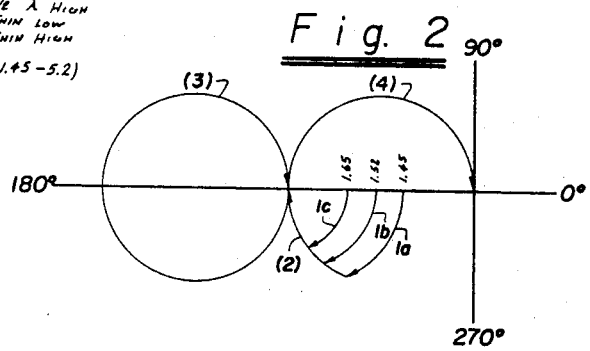
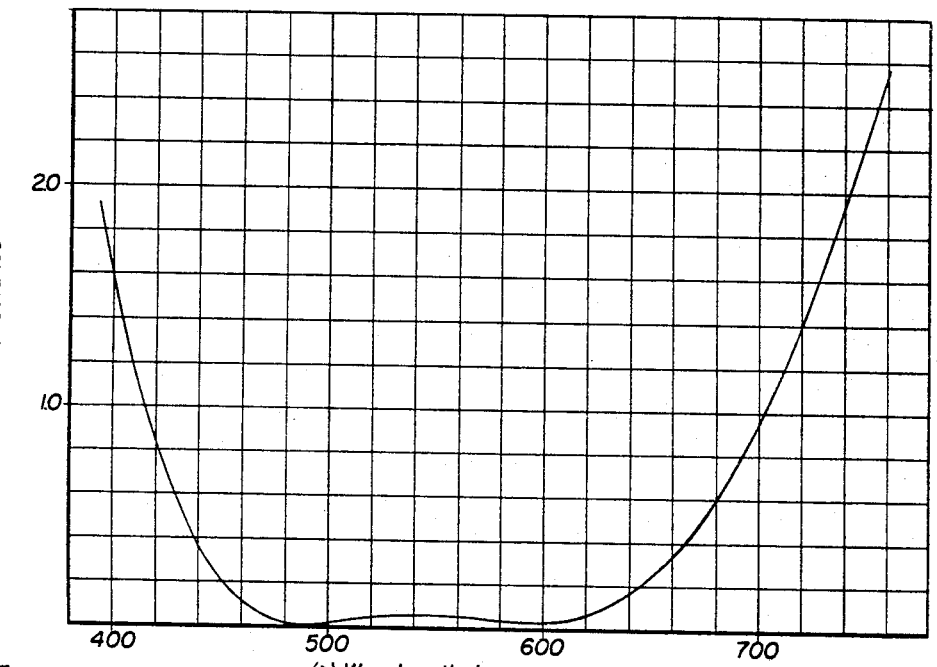
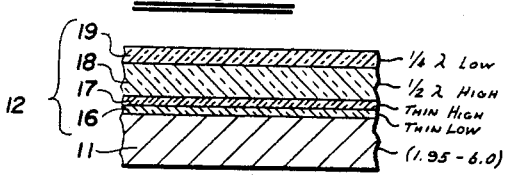
INVENTOR.
Frank C. Rock

3,432,225
ANTIREFLECTION COATING AND ASSEMBLY HAVING SYNTHESIZED LAYER OF INDEX OF REFRACTION
Frank C. Rock, Santa Rosa, Calif., assignor to Optical Coating Laboratory, Inc., Santa Rosa, Calif., a corporation of California
Filed May 4, 1964, Ser. No. 364,479
U.S. Cl. 350—164
Int. Cl. G02b 1/10; B29d 11/00
15 Claims

ABSTRACT OF THE DISCLOSURE

Antireflection coating having four layers with the first and second layers being relatively thin and having a combined optical thickness of substantially one-quarter of the design wavelength, the third layer being one-half of the design wavelength and the fourth layer one-quarter of the design wavelength in thickness, the third layer having a high index of refraction, the forth layer having a low index of refraction, with the first and second layers synthesizing a layer having a desired index of refraction which is intermediate the indices of refraction of the first and second layers.

---

This invention relates to an antireflection coating, assembly and method and more particularly to an antireflection coating, assembly and method in which four layers and two or more materials are utilized in the coating.

One and two layer antireflection coatings are well known to those skilled in the art and are of generally low efficiency. A three-layer antireflection coating is disclosed in copending application Ser. No. 136,479, filed Sept. 7, 1961, now United States Letters Patent No. 3,185,020, which requires the use of three different materials: a first layer of a material having a medium index of refraction; a second layer of a material having a high index of refraction; and a third layer of a material having a low index of refraction. Such a coating requires that each of the three layers be controlled in thickness and be controlled in refractive index. As the refractive index of the substrate on which the coating is mounted is changed, the refractive index of the first layer has to be changed accordingly. There is a direct relationship between the refractive index required for the first layer and the substrate in order to be able to obtain a successful high efficiency antireflection coating of the three layer type. Because of this relationship between the refractive index of the substrate and the refractive index of the first layer, it has been difficult in such three-layer coatings to control the shape of the antireflection curve, particularly at the center of the spectrum for which the coating is to be effective, e.g., from 500 to 550 millimicrons, because the reflectance in this region is primarily dependant upon the refractive index of the first layer of the three layer antireflection coating. Thus, if the first layer has an index of refraction which is too low, the center of the antireflection curve can rise to well over one-half of 1% so that the primary advantage over a single layer of magnesium fluoride coating is lost. In order to make a three-layer coating on a type of substrate which is commonly used, e.g., a substrate having a refractive index of 1.52, it is desirable that this first layer of the coating have an index of refraction of 1.65. At the present time, there is no reproducible material which has this refractive index which can be utilized for the first layer. For this reason, there is a necessity to find an alternative method for creating the effect of such a material out of the materials which at present are known to exist to provide a high efficiency antireflection coating and assembly which is capable of being manufactured under production conditions.

In general, it is an object of the present invention to provide a high efficiency antireflection coating and an assembly for the manufacture of the same which overcomes the above named disadvantages.

Another object of the invention is to provide an antireflection coating and assembly of the above character in which a single layer of desired refractive index is synthesized by the use of two or more thin layers of materials having higher and lower refractive indices.

Another object of the invention is to provide an antireflection coating and assembly in which the outer or final layer is chosen for maximum durability and for a refractive index as low as possible and in which the next to the outer or final layer is chosen to provide maximum bandwidth.

Another object of the invention is to provide an antireflection coating and assembly which can be utilized with substrates having different indices of refraction.

Another object of the invention is to provide an antireflection coating and assembly of the above character in which an additional layer can be readily incorporated in the coating and assembly to withstand undesirable environments without substantially affecting the spectral characteristics of the coating and assembly.

Another object of the invention is to provide an antireflection coating and assembly of the above character which utilizes four layers and at least two materials in the coating.

Another object of the invention is to provide an antireflection coating and assembly which does not have undesirable colorimetric properties.

Another object of the invention is to provide an antireflection coating and assembly of the above character which is particularly adapted for use with a synthetic plastic material as a substrate.

Another object of the invention is to provide an antireflection coating and assembly of the above character which can be readily and economically manufactured under production conditions.

Additional objects and features of the invention will appear from the following description in which the preferred embodiments are set forth in detail in conjunction with the accompanying drawings.

Referring to the drawings:

FIGURE 1 is a cross sectional view on a greatly enlarged scale of an antireflection coating and assembly incorporating my invention.

FIGURE 2 is a polar coordinate phase diagram showing the relationship between reflectance amplitude and phase between the reflected ray and the incident ray at one particular wavelength at the center of the band which is antireflected by the coating and assembly shown in FIGURE 1.

FIGURE 3 is a curve showing the reflectance of a typical antireflection coating incorporating my invention.

FIGURE 4 is a cross sectional view of an assembly on a greatly enlarged scale of an antireflection coating and assembly also incorporating my invention using substrates having higher indices of refraction.

FIGURE 5 is a polar coordinate phase diagram showing the relationship between reflectance amplitude and phase between the reflected ray and the incident ray for one particular wavelength in the center of the band which is antireflected by the coating and assembly shown in FIGURE 4.

In general, my optical assembly consists of a substrate with an antireflection coating disposed on a surface of the substrate. The antireflection coating is nonabsorbing and substantially colorless and consists of first and second layers counting from the substrate. The first and second layers are each formed of a material having a different index of refraction and each having an optical thickness of less than one quarter of the design wavelength of the antireflection coating and synthesizing the effect of a layer having an index of refraction between the indices of refraction of the two materials and an optical thickness of approximately one quarter of the design wavelength of the antireflection coating. At least one additional layer is disposed on the first and second layers to complete the antireflection coating.

More particularly, as shown in FIGURE 1 of the drawings my optical assembly consists of a transparent substrate 11, having a normal light reflecting surface of a suitable material, such as glass, which has an index of refraction (N) that can vary from 1.45 to as high as 5.2. An antireflection coating 12 is deposited upon the one surface of the substrate 11 and consists of four transparent, substantially colorless layers 16–19 inclusive which are formed of at least two different materials, in which one of the materials has a high index of refraction and the other has a low index of refraction.

In order to achieve maximum bandwidth for the antireflection coating, it is desirable that the material with a low index of refraction have as low an index of refraction as possible. One material found to be particularly satisfactory for use as the low index material is magnesium fluoride ($MgF_2$) which has an index of refraction of 1.38. Another material which can serve as a satisfactory low index material is silicon dioxide ($SiO_2$) which has an index of refraction of 1.45 with only some sacrifice in bandwidth of the antireflection coating. In general the low index material, in addition to having a low index of refraction, should be relatively hard and durable. Magnesium fluoride is generally quite satisfactory because it is relatively durable and provides a relatively wide bandwidth for the antireflection coating.

For the material having a high index of refraction, there is a range of values for the high index of refraction which will give the best bandwidth for the antireflection coating and at the same time make it possible to achieve low reflection values for the antireflection coating. This range for the high index material is from 2.00 to 2.10. If the refractive index is substantially higher than 2.10, the bandwidth of the antireflection coating narrows substantially. In general, with an index of refraction of over 2.10, it is still possible to obtain excellent reduction of reflection throughout the central region, but the sides of the antireflection curve move in so that the bandwidth is substantially narrower. When the refractive index of the high index material becomes lower than 2.00, the bandwidth is increased, but the central portion of the reflectance curve raises to thereby decrease the efficiency of the antireflection coating. One material found to be suitable for use as material having a high index of refraction is zirconium oxide which has an index of refraction of approximately 2.08. Other material which can be utilized are those of the type disclosed in Patent No. 3,034,924.

The first and second layers 16 and 17 of the antireflection coating 12 counting from the substrate 11 can be called thin layers and are used to synthesize a layer having an optical thickness of one-quarter of the design wavelength for the antireflection coating and of an intermediate refractive index between that of the substrate 11 and the layer 18. By the method herein described, this quarter wave layer of intermediate refractive index is synthesized by utilizing thin layers of materials that have lower and higher indices of refraction than the index of refraction desired. This is accomplished by depositing a first layer 16 of high index material to an optical thickness substantially less than one quarter of the design wavelength for the antireflection coating followed by a second layer of the material having a low index of refraction to a thickness also substantially less than one quarter of the design wavelength. The effect achieved by these two thin layers for reasons hereinafter described is a layer of intermediate refractive index and having an optical thickness of one-quarter of the design wavelength for the antireflection coating which makes it possible to create an optimum antireflection coating for substrate refractive indices varying from 1.45 to greater than 1.76.

At least one additional layer is deposited on the first and second layers. There a final or outer layer 19 is formed of the material having a low index of refraction and is deposited to a depth of one-quarter the design wavelength to provide a layer which has maximum durability and which properly antireflects the substrate. Still another layer, which is the next to the outer layer, is layer 18 which is provided to increase the bandwidth of the antireflection coating.

Layer 18 is a relatively thick layer and is deposited as homogenously as possible after the layers 16 and 17 have been deposited. It is formed of the material having the high index of refraction and is deposited to an optical depth equal to one-half of the design wavelength of the antireflection coating.

In FIGURE 2, there is shown a phase diagram indicating the method by which the antireflection coating and assembly shown in FIGURE 1 is designed and how it functions. First, there is shown in FIGURE 2, three curves identified as 1a, 1b and 1c, which start from the 180° axis at indices of refraction indicated as 1.45, 1.52 and 1.65, respectively. These indices of refraction indicate representative indices for the substrate 11. As can be seen from the phase diagram, as the index of refraction of the substrate increases, the reflectance amplitude is higher. Curves 1a, 1b and 1c indicate the phase relationship between the incident ray and the reflected ray at one particular wavelength and show what occurs when the first thin layer 16 is deposited on the substrates having the different indices of refraction. Thus, it can be seen that as the index of refraction of the substrate increases, the curve measured in degrees of arc length indicates the relative thickness of the first layer. Hence, as the refractive index of the substrate increases, layer 16 initially increases slightly in thickness and thereafter becomes thinner and thinner to arrive at the point where the curve identified as No. 2, which represents the second layer 17, commences.

As can be seen, curves for the second layer commence at the termination of the curves 1 and terminate at the 180° axis. As the refractive index of the substrate increases, the second layer 17 must become thinner. Termination at the 180° axis is desirable in order to make the reflectance curve for the antireflection coating symmetrical. If symmetry is not desired, it is not absolutely essential that a return be made to the 180° axis. In certain cases, it may be desirable to go slightly beyond the 180° axis. From the phase diagram it can be seen that the first and second layers are both deposited in optical thicknesses which are substantially less than one-quarter of the design wavelength of the antireflection coating to synthesize a layer having an index of refraction between the high and low indices of the materials used and an optical thickness of one-quarter of the design wavelength of the antireflection coating.

The third layer 18 is a high index layer and starts from the termination of the curve No. 2 at or near the 180° axis and goes through approximately 360° as shown in the phase diagram to return to the 180° axis to show that the third layer is deposited to an optical depth substantially equal to one-half of the design wavelength of the antireflection coating. Thus, the curve 3 goes through a complete circle or 360°. It is important that the third layer terminate at the 180° axis so that the fourth layer can start at the 180° axis. This is because the fourth layer has an optical thickness of one-quarter of the design wavelength of the antireflection coating and it is desirable to end up at zero or close to zero reflectance with the fourth layer. Thus, as can be seen, curve 4 for the fourth layer 19 is a semicircle and begins on the 180° axis and terminates at or near zero.

From the foregoing method using phase diagram design technique it can be seen that the optical thickness to which the first and second layers must be deposited in order to synthesize a layer having an intermediate index of refraction and an optical thickness of one-quarter of the design wavelength of the antireflection coating can be readily determined.

By way of example, two optical assemblies with antireflection coatings incorporating my invention are set forth below with the optical thickness designated by the wavelength in millimicrons at which the layer is a quarter wave thick. (Note.—An alternative would be to divide all values in the table by 515).

| Substrate Index | Layer | | | | Medium $n=1.0$ Air |
|---|---|---|---|---|---|
| | 16 | 17 | 18 | 19 | |
| | $n=2.08$ $ZrO_2$ | $n=1.38$ $MgF_2$ | $n=2.08$ $ZrO_2$ | $n=1.38$ $MgF_2$ | |
| 1.52 | 110 | 125 | 1,030 | 515 | 1.00 |
| 1.60 | 119 | 105 | 1,030 | 515 | 1.00 |

The reflectance curve for an antireflection coating constructed in accordance with the second example in which the design wavelength is 515 millimicrons is shown in FIGURE 3. From this curve, it can be seen that the antireflection coating has a relatively wide band width and has a very low reflectance, i.e., below 0.2% visual reflectance.

In FIGURE 4, there is shown an optical assembly incorporating the same design principles as hereinbefore described but for a substrate which has a substantially higher index of refraction as, for example, from 1.95 to 6.0 and which includes a material such as germanium which has an index of refraction of 4.0. The antireflection coating 12 is made up of the four layers 16, 17, 18 and 19 formed of two materials having high and low indices of refraction. One suitable material having a low index of refraction is silicon monoxide which has an index of refraction of 1.85. One suitable material having a high index of refraction is germanium having an index of refraction of 4.0 as hereinbefore pointed out. As with the embodiment hereinbefore described, the first two layers 16 and 17 are deposited for the purpose of lowering the effective refractive index of the substrate to a value such that it can be perfectly antireflected by the fourth layer having a thickness of one-quarter of the design wavelength of the antireflection coating. In the embodiment hereinbefore described, the substrate had an index of refraction in which it was desired to increase or raise the effective refractive nidex of the substrate to a value so that it could be properly antireflected by the fourth layer.

In the embodiment shown in FIGURE 4 the first layer 16 is formed of a material having a low index of refraction. This layer is represented by the curve 1 in the phase diagram shown in FIGURE 5. As can be noted from FIGURES 2 and 5, the centers of the arcs, semicircles and circles move outward as a refractive index increases. Then also the arcs, semicircles nad circles are formed by rotation in a clockwise direction. Thus, for the low index layer 16, the curve 1 moves upwardly and clockwise to indicate a layer which is deposited to an optional thickness substantially less than one-quarter of the design wavelength for the antireflection coating. Similarly, the second layer 17 is a thin layer of the high index material and is represented by curve 2 in FIGURE 5. It also is deposited to a depth substantially less than one-quarter of the design wavelength of the antireflection coating. The first and second layers in effect provide a synthesized layer which has an intermediate index of refraction and which has a thickness of one-quarter of the design wavelength. The third layer 18 is next deposited and is formed of a material which has a high index of refraction and is deposited to an optical depth equal to one-half of the design wavelength of the antireflection coating. Thus, as shown in FIGURE 5 by the #3 curve, the curve starts at 180° axis, travels through 360° and ends at the 180° axis. The second and third layers may be formed of the same material since they should both be of a high index of refraction. The fourth or outer layer 19 is next deposited and is formed of a material having a low index of refraction and is deposited to a depth of one-quarter of the design wavelength of the antireflection coating. This is shown by curve 4 in FIGURE 5. The curve starts at 180° axis and terminates at or near the zero intersection.

The crossover point to determine whether the materials of the type shown in FIGURE 1 should be utilized or the ones shown in FIGURE 4 should be utilized is determined by the refractive index of the final or fourth layer. A substrate is perfectly antireflected by the final layer when the substrate has an index of refraction which is equal to the index of refraction of the final layer squared. In other words, if the final layer has a refractive index of 1.5, the crossover point is that of a subtrate having a refractive index of 2.25. Where magnesium fluoride ($n=1.38$) is used for the outer layer, the crossover point is $(1.38)^2$ which is approximately equal to 1.90. With a substrate with this index, magnesium fluoride is almost a perfect coating all by itself. With indices of refraction such as that shown in FIGURE 4, magnesium fluoride is not a suitable material. A more desirable low index material is silicon monoxide which has an index of refraction of 1.85. This is an ideal antireflection coating for a substrate having a refractive index of $(1.85)^2$ which is equal to approximately 3.4.

By way of example the substrates having the following indices of refraction can be utilized with the following outer or fourth layers.

| Outer Layer | $MgF_2$ | SiO | ZnS | CdSe |
|---|---|---|---|---|
| Figs. 1 and 2 | 1.45–1.76 | 1.45–3.2 | 1.7–4.4 | 2.0–5.2 |
| Figs. 4 and 5 | 1.95–6.0 | 3.5–6 | | |

By the foregoing method, it can be seen that layers are deposited on the substrate to modify the effective refractive index of the substrate to a new value that is properly antireflected by the material utilized for the outer layer. The reflectance can be brought down to zero but this would have the undesired effect of narrowing the bandwidth. Also, if the reflectance is brought down to zero, there is no green light and undesirable colormetric properties are exhibited by the coating. For example, it may appear to be blue or red and not a pleasing grey which is one of the desired colors for the antireflection coating. These desirable colormetric properties can be achieved by not returning the fourth layer exactly to zero. In the foregoing embodiments, it is the final layer which does all of the antireflecting. The third layer is utilized solely for increasing the band width of the antireflection coating.

I have found that the antireflection coating herein described can also be deposited upon synthetic plastic substrates without any difficulty. In general, synthetic plastics have an index of refraction ranging from 1.45 to 1.62. By utilizing the four layer method hereinbefore described, it is possible to adjust for the index of refraction of the synthetic plastic substrate merely by adjusting the thickness of the first and second layers deposited upon the synthetic plastic. Because synthetic plastics cannot withstand too much heat, it is necessary at times to utilize materials which can be deposited on a cold surface When depositing on a cold surface, it may be necessary to utilize different materials because the materials when deposited on a cold surface may have a different index of refraction. For example, titanium dioxide, when deposited on a hot surface, has a refractive index of approximately 2.3, but when deposited on a cold surface, drops to 2.0 to 2.1 and thus forms a material suitable for an effective antireflection coating for synthetic plastics utilizing the method herein disclosed.

Although the coatings hereinbefore described have been described as utilizing only two materials, if desired, more than two materials can be used. Also, although only four layers have been described in the embodiments herein disclosed, an additional fifth layer can be provided to protect the filters from undesirable environments. Thus, the last or fourth layer can be deposited by evaporation so that approximately three-fourths of the layer has been deposited. The fourth layer then can be completed by utilizing a fifth layer of a material of a different type as, for example, one of a higher refractive index (e.g., $Al_2O_3$ and $SiO_2$) which is more durable to unfavorable environments. Thus, it is possible to achieve an antireflection coating which has substantially the same spectral characteristics but which is protected from unfavorable environments by the fifth layer. In fact, the fifth layer is not a separate layer but is actually substituted for a part of the fourth layer.

It is apparent from the foregoing that I have provided an improved antireflection coating and assembly and method for formation of the same. The antireflection coating is particularly advantageous in that it is possible to form the coating from only two materials while still obtaining a very high efficiency. The method, in particular, makes it possible to synthesize a certain layer so that it will effectively represent a layer of a different index of refraction and a different optical thickness.

In particular, my method has made it possible to apply antireflection coatings to substrates having higher indices of refraction as, for example, in the coating of optical systems which employ high index glasses and certain plastics as substrates.

I claim:

1. In an article of the character described, a substrate having a normal light reflecting surface and an anti-reflection coating disposed on the surface, the antireflection coating comprising at least four layers identified as the first, second, third and fourth layers counting from the substrate, the first and second layers being formed of materials having different indices of refraction and having optical thicknesses substantially less than one-quarter of the design wavelength of the antireflection coating and in effect synthesizing a layer having an index of refraction intermediate the indices of refraction of the material forming the first and second layers and serving to modify the effective refractive index of the substrate, said first and second layers having a combined optical thickness equal to approximately one-quarter of the design wavelength of the antireflection coating, said third layer being formed of a material having a high index of refraction and said fourth layer being formed of material having a low index of refraction, said third layer having an optical thickness substantially greater than the optical thickness of said fourth layer.

2. An article as in claim 1 wherein said coating is formed of only two materials and wherein one of said materials has a high index of refraction and the other said material has a low index of refraction.

3. In an optical assembly, a substrate having a normal light reflecting surface, an antireflection coating disposed on the surface, the antireflection coating comprising first, second, third and fourth layers counting from the substrate, the first and second layers being formed of materials having different indices of refraction, and having optical thicknesses substantially less than one-quarter of the design wavelength of the antireflection coating and in effect synthesizing a layer having an index of refraction intermediate the indices of refraction of the materials forming the first and second layers and serving to modify the effective refractive index of the substrate, said first and second layers having a combined optical thickness equal to approximately one-quarter of the design wavelength of the antireflection coating, said third layer being formed of a material having a high index of refraction and having an optical thickness of substantially one-half of the design wavelength of the antireflection coating, said fourth layer being formed of a material having a low index of refraction and having an optical thickness of substantially one-quarter of the design wavelength of the antireflection coating.

4. An assembly as in claim 3 wherein said first, second, third and fourth layers are formed of at least two materials, one of said two materials having a high index of refraction and the other of said two materials having a low index of refraction.

5. An optical assembly as in claim 3 wherein the first layer is formed of a material having a high index of refraction and wherein the second layer is formed of a material having a low index of refraction.

6. An optical assembly as in claim 3 wherein the first layer is formed of a material having a low index of refraction and wherein the second layer is formed of a material having a high index of refraction.

7. An optical assembly as in claim 3 wherein said substrate is formed of a synthetic plastic.

8. An optical assembly as in claim 3 wherein the outer layer is formed of magnesium fluoride.

9. An optical assembly as in claim 3 wherein the outer layer is formed of silicon dioxide.

10. An optical assembly as in claim 3 wherein the outer layer is formed of zinc sulfide.

11. An optical assembly as in claim 3 wherein the outer layer is formed of cadmium selenide.

12. In an optical assembly, a substrate having a reflecting surface and an antireflection coating disposed on the surface, the antireflection coating being comprised of first, second, third and fourth layers counting from the substrate, the first and second layers each being formed of a material having a different index of refraction and having optical thicknesses substantially less than one-quarter of the design wavelength of the antireflection coating and serving to modify the effective refractive index of the substrate, said first and second layers having a combined optical thickness of substantially one quarter of the design wavelength, the third layer having an optical thickness of substantially one-half of the design wavelength of the antireflection coating and the fourth layer having an optical thickness of substantially one-fourth of the design wavelength of the antireflection coating, said first, second, third and fourth layers being formed of two materials, one of the materials having a high index of refraction and the other of the materials having a low index of refraction, the first and second layers being formed of materials having high and low indices of refraction, the third layer being formed of a material having a high index of refraction and the fourth layer being formed of a material having a low index of refraction.

13. An assembly as in claim 12 wherein the first layer is formed of a material having a low index of refraction and the second layer is formed of a material having a high index of refraction.

14. An assembly as in claim 12 wherein the first layer is formed of a material having a high index of refraction and the second layer is formed of a material having a low index of refraction.

15. In an antireflection coating for use on a substrate having a reflecting surface, the antireflection coating comprising first, second, third and fourth layers, the first layer being adapted to be disposed on the surface of the substrate, the first and second layers being formed of materials having different indices of refraction and having an optical thickness substantially less than one-quarter of the design wavelength of the antireflection coating said first and second layers having a combined optical thickness of one-quarter of the design wavelength and being adapted to modify the effective refractive index of the substrate, the third layer having an optical thickness of one-half of the design wavelength of the antireflection coating and a fourth layer having an optical thickness of one-fourth of the design wavelength of the antireflection coating, said first, second, third and fourth layers being formed of two different materials, one of the materials having a high index of refraction and the other of the materials having a low index of refraction, the first and second layers being formed of layers of the two materials, the third layer being formed of material having a high index of refraction and the fourth layer being formed of a material having a low index of refraction.

References Cited

UNITED STATES PATENTS

| | | | |
|---|---|---|---|
| 2,420,168 | 5/1947 | Dimmick | 350—164 |
| 2,478,385 | 8/1949 | Gaiser | 350—164 |
| 2,761,797 | 9/1956 | Young | 350—164 X |
| 3,147,132 | 9/1964 | Geffcken. | |
| 3,185,020 | 5/1965 | Thelen | 350—164 |
| 3,235,397 | 2/1966 | Millendorfer | 350—164 |

OTHER REFERENCES

Kruse, McGlauchin and McQuistan: Elements of Infrared Technology, Generation, Transmission, and Detection; 1962; Published by John Wiley & Sons.

Osterberg and Kashdan: "Abstract 53" and Pride and Kashdan, "Abstract 54"; 42 J. O. 5A.291, April, 1952.

Turner, A. F.: "Some Current Developments in Multilayer Optical Films; Reprinted from Le Journal de Phisique et le Radivin; vol. 11, pp. 444–457; July, 1950.

U.S. Defense Supply Agency: Military-Handbook–141; Optical Design; Oct. 5, 1962, pp. 21–66 and 21–67.

DAVID SCHONBERG, *Primary Examiner.*

T. H. KUSMER, *Assistant Examiner.*

U.S. Cl. X.R.

117—33.3